US009897342B2

(12) United States Patent
Sugie

(10) Patent No.: US 9,897,342 B2
(45) Date of Patent: Feb. 20, 2018

(54) HOT WATER GENERATOR

(71) Applicant: TLV CO., LTD., Hyogo (JP)

(72) Inventor: Yuichi Sugie, Hyogo (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 14/403,759

(22) PCT Filed: May 24, 2013

(86) PCT No.: PCT/JP2013/064527
§ 371 (c)(1),
(2) Date: Nov. 25, 2014

(87) PCT Pub. No.: WO2013/176269
PCT Pub. Date: Nov. 28, 2013

(65) Prior Publication Data
US 2015/0136042 A1    May 21, 2015

(30) Foreign Application Priority Data

May 25, 2012  (JP) ................................. 2012-119714
May 25, 2012  (JP) ................................. 2012-119715

(51) Int. Cl.
*F24H 9/20* (2006.01)
*F24H 1/14* (2006.01)
(Continued)

(52) U.S. Cl.
CPC ......... *F24H 9/2007* (2013.01); *F24D 10/003* (2013.01); *F24D 19/1015* (2013.01);
(Continued)

(58) Field of Classification Search
CPC ................................ F24H 9/2007; F24H 1/10
See application file for complete search history.

(56) References Cited

U.S. PATENT DOCUMENTS 571,016 A * 11/1896 Pratt .................... F16L 55/136
                                                          122/364
2,446,995 A *  8/1948 Bay ........................ F02N 19/10
                                                         123/41.08
(Continued)

FOREIGN PATENT DOCUMENTS

CN          87101238 A      6/1988
CN           1225440 A      8/1999
(Continued)

OTHER PUBLICATIONS

"Check valves"—dated Sep. 30, 2011.*
(Continued)

*Primary Examiner* — Nathaniel Herzfeld
(74) *Attorney, Agent, or Firm* — The Webb Law Firm

(57) ABSTRACT

A cold water intake pipe 4 and a hot water extraction pipe 5 that communicate with multiple spiral tubes 101 and a steam supplying pipe 2 and a condensate discharge pipe 3 that communicate with a shell are connected to a corrugated spiral tube type heat exchanger 1. Between the cold water intake pipe 4 and multiple spiral tubes 101, communication paths 46 that communicate between the cold water intake pipe 4 and some multiple spiral tubes 101a are provided, and a valve 44 is provided to communicate between the cold water intake pipe 4 and the other multiple spiral tubes 101b when the force acting from the cold water intake pipe 4 becomes larger than the force acting from the other multiple spiral tubes 101b and to block the cold water intake pipe 4 from the other multiple spiral tubes 101b when the force acting from the cold water intake pipe 4 becomes smaller than the force acting from the other multiple spiral tubes 101b.

10 Claims, 5 Drawing Sheets

(51) Int. Cl.
| | |
|---|---|
| F24H 9/12 | (2006.01) |
| F28F 9/02 | (2006.01) |
| F28F 27/02 | (2006.01) |
| F28D 7/16 | (2006.01) |
| F24D 10/00 | (2006.01) |
| F24D 19/10 | (2006.01) |
| F24H 1/10 | (2006.01) |

(52) U.S. Cl.
CPC .............. *F24H 1/10* (2013.01); *F24H 1/14* (2013.01); *F24H 9/128* (2013.01); *F28D 7/1669* (2013.01); *F28F 9/02* (2013.01); *F28F 27/02* (2013.01); *F24D 2200/13* (2013.01); *F24D 2220/025* (2013.01); *F24D 2220/046* (2013.01); *F24D 2220/06* (2013.01)

(56) References Cited

U.S. PATENT DOCUMENTS

| | | | | |
|---|---|---|---|---|
| 3,081,823 | A | * | 3/1963 | Constantikes .......... F28F 27/00 165/295 |
| 3,877,514 | A | * | 4/1975 | Beck ....................... F28F 27/02 137/493 |
| 3,990,504 | A | * | 11/1976 | Kolthoff, Jr. ....... F28D 1/05341 123/41.08 |
| 4,444,016 | A | * | 4/1984 | Banerjee .............. B01D 5/0027 62/48.2 |
| 4,445,023 | A | * | 4/1984 | McKenney ........... F24D 11/002 165/101 |
| 4,850,427 | A | | 7/1989 | Lauro et al. |
| 4,991,643 | A | * | 2/1991 | Price ....................... F28F 27/02 165/101 |
| 5,242,011 | A | * | 9/1993 | Hesse ..................... F01P 11/18 137/539 |
| 8,393,383 | B2 | | 3/2013 | Yumoto |
| 2007/0119962 | A1 | * | 5/2007 | Peckham ................ F24D 1/005 237/19 |
| 2009/0229812 | A1 | * | 9/2009 | Pineo ....................... F01M 5/00 165/297 |
| 2011/0067853 | A1 | * | 3/2011 | Moser .................... F01M 5/002 165/297 |
| 2016/0003468 | A1 | * | 1/2016 | Malone ................ F24H 1/0072 122/15.1 |

FOREIGN PATENT DOCUMENTS

| | | |
|---|---|---|
| CN | 2883835 Y | 3/2007 |
| CN | 2930875 Y | 8/2007 |
| CN | 101603731 A | 12/2009 |
| CN | 102032371 A | 4/2011 |
| CN | 202048253 U | 11/2011 |
| JP | S5633480 U1 | 4/1981 |
| JP | 58-12997 | 1/1983 |
| JP | S6093299 A | 5/1985 |
| JP | 3058691 | 6/1999 |
| JP | 2002-130821 | 5/2002 |
| JP | 2008-111597 | 5/2008 |
| JP | 2010-025394 | 2/2010 |

OTHER PUBLICATIONS

International Search Report and Written Opinion, dated Aug. 27, 2013, issued in corresponding International Application No. PCT/JP2013/064527.

* cited by examiner

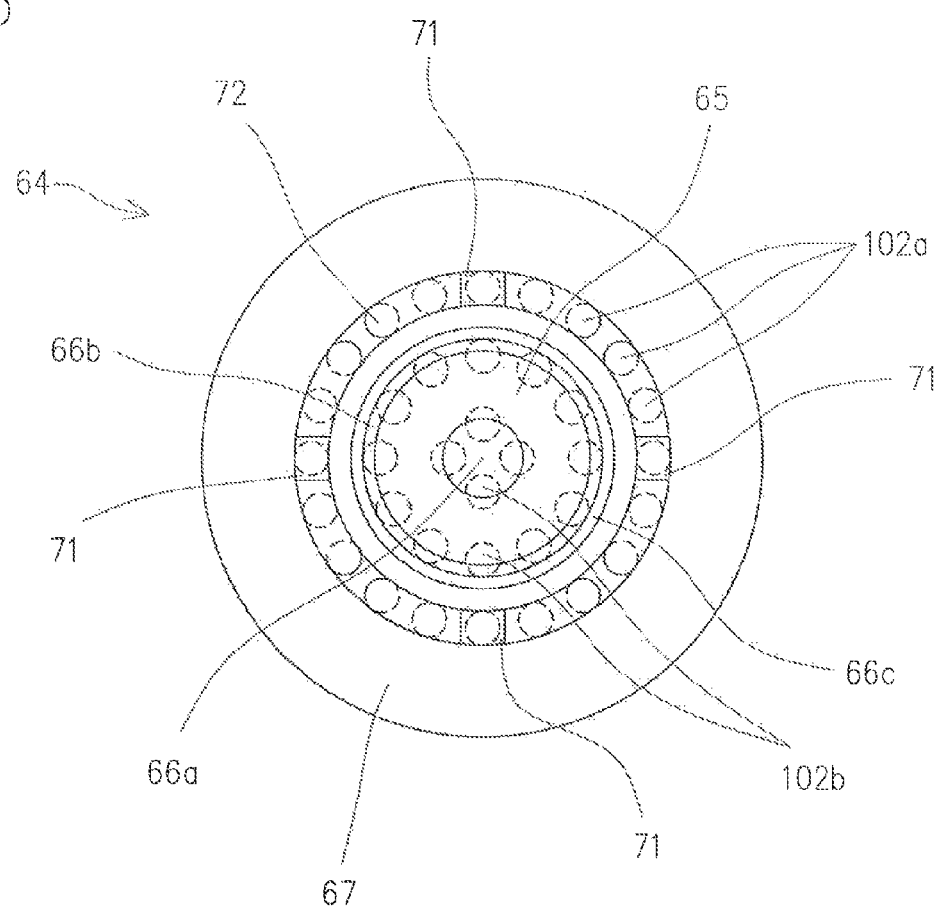

HOT WATER GENERATOR

TECHNICAL FIELD

The present invention relates to a hot water generator that generates hot water by heating cold water with steam heat.

BACKGROUND ART

Conventional hot water generators include one shown, for example, in Japanese Unexamined Patent Application Publication No. 2010-25394. This is such that a cold water intake pipe and a hot water extraction pipe that communicate with multiple spiral tubes and a steam supplying pipe and a condensate discharge pipe that communicate with a shell of a corrugated spiral tube type heat exchanger are connected to the heat exchanger.

PRIOR ART LITERATURES

Patent Literatures

Patent Literature 1: Japanese Unexamined Patent Application Publication No. 2010-25394

SUMMARY OF INVENTION

Problem

In the above conventional hot water generator, when the cold water flow rate from the cold water intake pipe falls, the cold water flow velocity in the multiple spiral tubes falls, and it is difficult to generate turbulence in cold water within the multiple spiral tubes. Therefore, the heat transfer efficiency of cold water and steam may fall, and hot water may fall to a preset temperature or below. In case where the cold water flow rate from the cold water intake pipe is enough, when the amount of hot water extraction from the hot water extraction pipe is reduced, the heat transfer area of the overall spiral tubes becomes excessive. Therefore, the heat exchange between cold water and steam becomes excessive, and hot water may accordingly rise to the preset temperature or more.

Therefore, the problem to be solved by the present invention is to provide a hot water generator in which, when the cold water flow rate from a cold water intake pipe falls, hot water can be prevented from falling to a preset temperature or below, and when the hot water extraction amount from a hot water extraction pipe is reduced, hot water can be prevented from rising to a preset temperature or more.

Solution to Problem

To solve the above problem, a hot water generator of the present invention in which a cold water intake pipe and a hot water extraction pipe that communicate with multiple spiral tubes and a steam supplying pipe and a condensate discharge pipe that communicate with a shell are connected to a corrugated spiral tube type heat exchanger has the following characteristics. Between the cold water intake pipe and the multiple spiral tubes, a communication path that communicates between the cold water intake pipe and some of the multiple spiral tubes is provided. A valve is provided to communicate between the cold water intake pipe and the others of the multiple spiral tubes when the force acting from the cold water intake pipe is greater than the force acting from the others of the multiple spiral tubes and to block the cold water intake pipe from the others of the multiple spiral tubes when the force acting from the cold water intake pipe is smaller than the force acting from the others of the multiple spiral tubes.

Advantageous Effect of Invention

According to the present invention, when the cold water flow rate from the cold water intake pipe falls, the force acting from the cold water intake pipe is reduced to be smaller than the force acting from the others of the multiple spiral tubes. Accordingly, the valve blocks the cold water intake pipe from the multiple spiral tubes. Thereby, cold water is supplied only to some of the multiple spiral tubes through a communication path, and the reduction in the cold water flow velocity in some of the multiple spiral tubes can be prevented. As a result, an advantageous effect that hot water does not fall to a preset temperature or below is obtained.

In addition, when the amount of hot water extraction from the hot water extraction pipe is reduced, the force acting from the others of the multiple spiral tubes increases, and the force acting from the cold water intake pipe becomes smaller than the force acting from the others of the multiple spiral tubes. Therefore, the valve blocks the cold water intake pipe from the others of the multiple spiral tubes. Thereby, cold water is supplied only to some of the multiple spiral tubes through the communication path, and the heat transfer area can be prevented from becoming excessive. As a result, an advantageous effect that hot water does not rise to the preset temperature or more is obtained.

BRIEF DESCRIPTION OF DRAWINGS

FIG. 5 is a plan view of a valve of FIG. 4.

EMBODIMENTS FOR CARRYING OUT INVENTION

Figure 1:
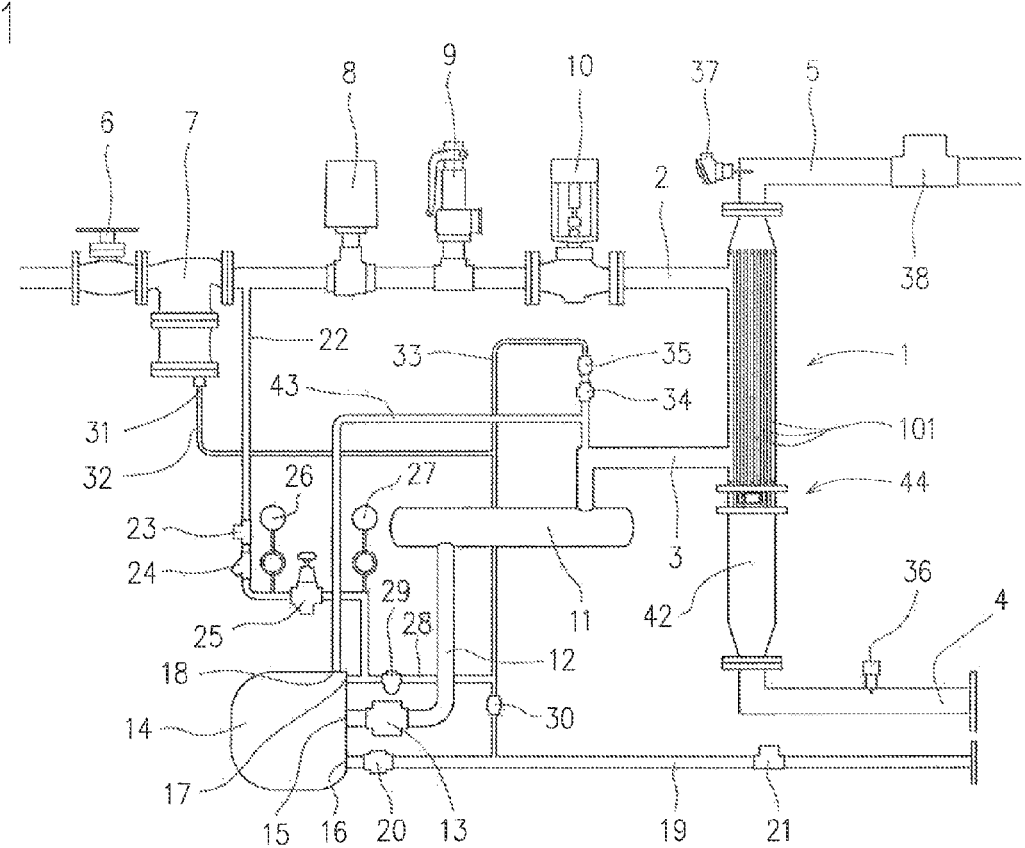
FIG. 1 is a configuration diagram of a hot water generator of an embodiment of the invention.
Figure 2:
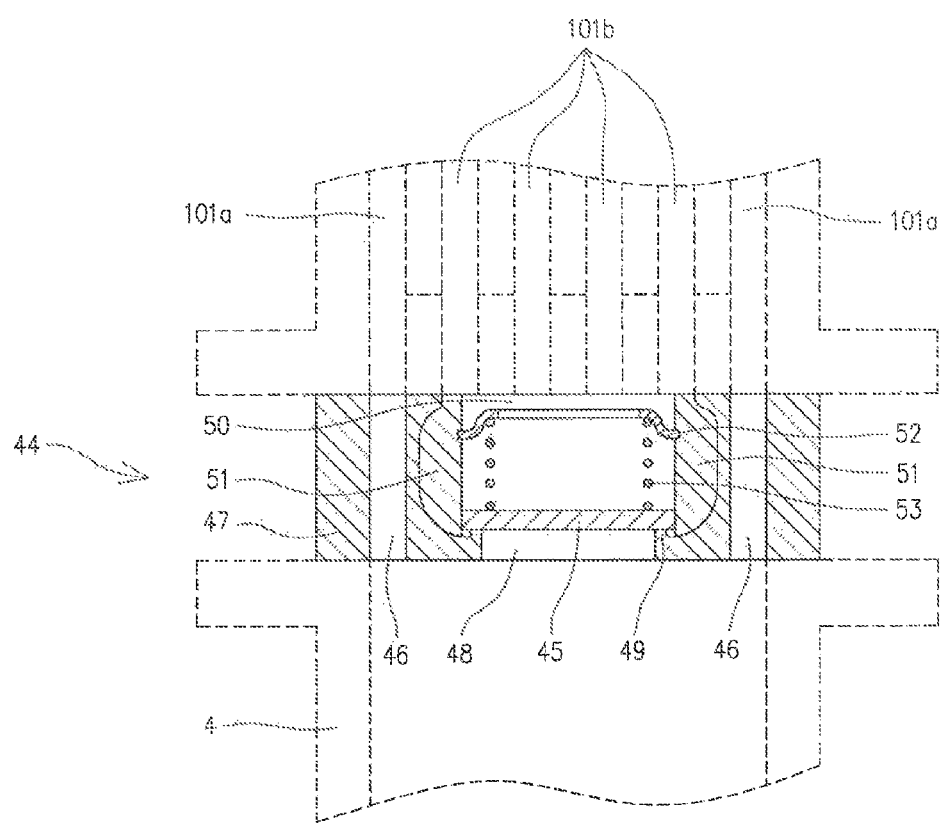
FIG. 2 is a sectional view of a valve of FIG. 1.
Figure 3:
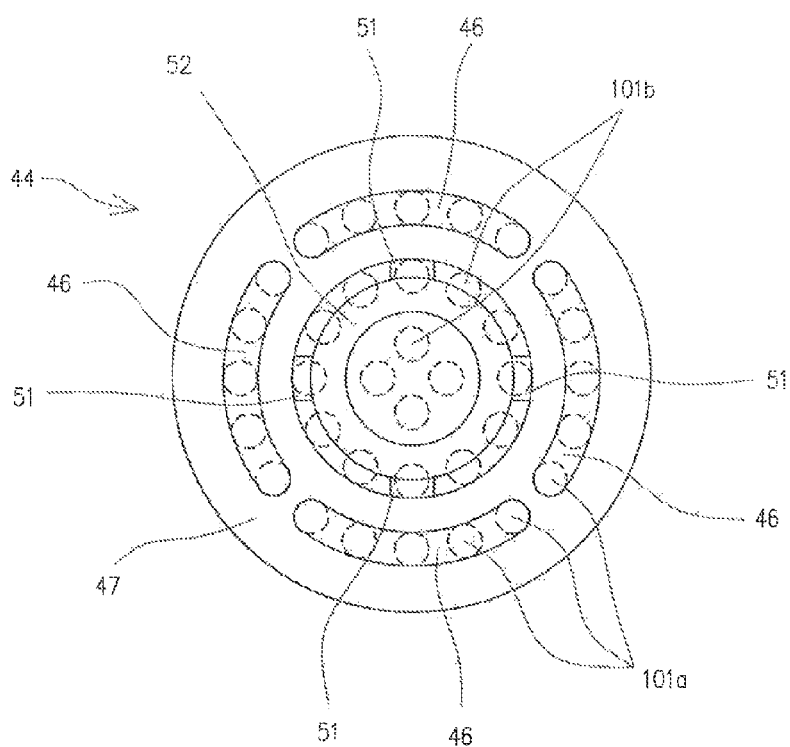
FIG. 3 is a plan view of a valve of FIG. 2.

Hereinafter, an embodiment of the invention is described with reference to FIGS. 1 to 3. FIG. 1 is a configuration diagram containing a heat exchanger sectional view of a hot water generator of the embodiment of the invention. FIG. 2 is a sectional view of a valve of FIG. 1. FIG. 3 is a plan view of the valve of FIG. 2. A cold water intake pipe 4 and a hot water extraction pipe 5 that communicate with multiple spiral tubes 101 and a steam supplying pipe 2 and a condensate discharge pipe 3 that communicate with a shell of a corrugated spiral tube type heat exchanger 1 (space inside the fuselage) are connected to the heat exchanger 1. An opening and closing valve 6, a gas-liquid separator 7, an electrically operated valve 8 as an operating valve, a safety valve 9, and a control valve 10 are attached to the steam supplying pipe 2 from the upstream side. A header tank 11 is connected to the condensate discharge pipe 3. The header tank 11 temporarily stores therein the condensate discharged from the heat exchanger 1. A condensate inflow pipe 12 is connected to the header tank 11. A check valve 13 and a condensate pump 14 are attached to the condensate inflow pipe 12 from the upstream side. The check valve 13 permits the passage of the fluid from the header tank 11 to condensate pump 14 and prevents the passage in the opposing direction.

The condensate pump 14 has a condensate inflow opening 15, a condensate pumping opening 16, a steam introduction opening 17, and a steam outlet 18. The condensate inflow pipe 12 is connected to the condensate inflow opening 15 via the check valve 13. A condensate pumping pipe 19 is connected to the condensate pumping opening 16. A check valve 20 and an opening and closing valve 21 are attached to the condensate pumping pipe 19 from the upstream side. The check valve 20 permits the passage of the fluid from the condensate pump 14 to opening and closing valve 21 and prevents the passage in the opposing direction. A steam introduction pipe 22 branching from the steam supplying pipe 2 is connected to the steam introduction opening 17, and an opening and closing valve 23, a strainer 24, and a pressure reducing valve 25 are connected to the steam introduction pipe 22 from the upstream side. A manometer 26 and a manometer 27 are formed before and after the pressure reducing valve 25 of the steam introduction pipe 22. A condensate removal pipe 28 that branches from the connection portion of the steam introduction pipe 22 to the steam introduction opening 17 is connected to the condensate pumping pipe 19. A steam trap 29 and a check valve 30 are attached to the condensate removal pipe 28 from the upstream side. The steam trap 29 discharges no steam and automatically discharges condensate to the check valve 30 on the downstream side. The check valve 30 permits the passage of the fluid from the steam trap 29 to the condensate pumping pipe 19, and prevents the passage in the opposing direction. The steam outlet 18 is connected to the upstream side of a vent valve 34 of the following initial air discharge pipe 33 through a discharge pipe 43.

The condensate pump 14, when a float disposed therein and not illustrated is located in the lower portion thereof, closes the steam introduction opening 17 and opens the steam outlet 18 to make the condensate collected in the header tank 11 flow down from the condensate inflow opening 15 thereinto via the check valve 13. Then, the condensate pump 14, when the condensate is collected therein and the float not illustrated is located in a predetermined upper portion thereof, closes the steam outlet 18 and opens the steam introduction opening 17 to make the steam of the steam introduction pipe 22 flow from the steam introduction opening 17 thereinto, and then to pump the condensate collected therein to a desired pump destination from the condensate pumping opening 16 through the condensate pumping pipe 19. The condensate pump 14, when the internal liquid level falls by pumping the condensate, closes the steam introduction opening 17 again and opens the steam outlet 18 to make the condensate flow down from the condensate inflow opening 15 thereinto. By repeating such an operation cycle, the condensate pump 14 pumps the condensate from the header tank 11 to the desired pump destination.

A condensate outlet 31 of the gas-liquid separator 7 is connected between the steam trap 29 of the condensate removal pipe 28 and the check valve 30 with a condensate removal pipe 32. The initial air discharge pipe 33 that branches from the condensate discharge pipe 3 is connected to the condensate removal pipe 32. A vent valve 34 and a check valve 35 are attached to the initial air discharge pipe 33. The vent valve 34 is used to discharge initial air of the header tank 11. The check valve 35 permits the passage of fluid from the vent valve 34 to the condensate removal pipe 32 and prevents the passage in the opposing direction. A flow switch 36 is formed to the cold water intake pipe 4. A temperature sensor 37 is formed to the hot water extraction pipe 5, and an opening and closing valve 38 is attached to a destination where hot water is used. A cold water reservoir 42 is provided to the cold water intake pipe 4 side of the heat exchanger 1. The cold water reservoir 42 can be formed integrally with the heat exchanger 1 or provided between the heat exchanger 1 and cold water intake pipe 4 separately from the heat exchanger 1.

Between the cold water intake pipe 4 and the multiple spiral tubes 101, a valve 44 is provided to allow and block communication between the cold water intake pipe 4 and other multiple spiral tubes 101b.

As shown in FIGS. 2 to 3, the valve 44 is provided with communication paths 46 that communicate between the cold water intake pipe 4 and some multiple spiral tubes 101a, disposed between a flange on the spiral tube side and a flange on the cold water reservoir side, and sandwiched and immobilized by fastening means including bolts and nuts not illustrated. In FIGS. 2 to 3, the multiple spiral tubes 101 have each a circular cross section, and illustrated as the some multiple spiral tubes 101a and other multiple spiral tubes 101b.

The illustrated some spiral tubes 101a and other multiple spiral tubes 101b do not show all the multiple spiral tubes 101, and actually, also between each tube, spiral tubes are present densely. Note that the cross section shape of each spiral tube may have other than a circular shape. For example, the cross section of each spiral tube may have a polygonal shape, such as a hexagon.

An inlet 48, an annular valve seat 49, and an outlet 50 are formed in a valve casing 47 of the valve 44. Multiple ribs 51, for example, four ribs, that introduce the periphery of a valve body 45 are formed to the inner circumferential wall of the valve casing 47. The disc-like valve body 45 is disposed to the outlet 50 side of the annular valve seat 49. A spring bearing 52 having a hole for fluid passage in its center is disposed to have a periphery inserted in the slots of the ribs 51. A coil spring 53 that biases the valve body 45 toward the annular valve seat 49 is disposed between the valve body 45 and spring bearing 52.

When the force by the fluid pressure acting from the cold water intake pipe 4 is greater than the combined forces of the fluid pressure acting from the other multiple spiral tubes 101b, the elastic force of the coil spring 53, and the weight of the valve body 45, the valve 44 communicates between the cold water intake pipe 4 and the other multiple spiral tubes 101b.

On the other hand, when the force by the fluid pressure acting from the cold water intake pipe 4 is smaller than the combined forces of the fluid pressure acting from the other multiple spiral tubes 101b, the elastic force of the coil spring 53, and the weight of the valve body 45, the valve 44 blocks the communication between the cold water intake pipe 4 and the other multiple spiral tubes 101b.

The coil spring 53 is omissible in the valve 44. In this case, when the force by the fluid pressure acting from the cold water intake pipe 4 is greater than the combined force of the fluid pressure acting from the other spiral tubes 101b and the weight of the valve body 45, the valve 44 can communicate between the cold water intake pipe 4 and the other multiple spiral tubes 101b, and when the force by the fluid pressure acting from the cold water intake pipe 4 is smaller than the combined forces of the fluid pressure acting from the other multiple spiral tubes 101b and the weight of the valve body 45, the valve 44 can block the communication between the cold water intake pipe 4 and the other multiple spiral tubes 101b.

The multiple communication paths 46, for example, four paths, are provided to the valve casing 47 of the periphery of the valve 44. The communication paths 46 can be formed integrally with the valve 44 or provided separately from the valve 44 outside the valve 44.

When the flow rate of cold water from the cold water intake pipe 4 is reduced, the force acting from the cold water intake pipe 4 is reduced. Then, the force acting from the cold water intake pipe 4 becomes smaller than the force acting from the other multiple spiral tubes 101b (combined forces of the fluid pressure acting from the other multiple spiral tubes 101b, the elastic force of the coil spring 53, and the weight of the valve body 45). Accordingly, the valve body 45 is seated on the annular valve seat 49, and the valve 44 blocks the cold water intake pipe 4 from the other multiple spiral tubes 101b. Therefore, since cold water is supplied only to the some multiple spiral tubes 101a through the communication paths 46, and the reduction in the flow velocity of cold water in the some multiple spiral tubes 101a is preventable, hot water does not fall to a preset temperature or below.

Additionally, when the amount of hot water extraction from the hot water extraction pipe 5 is reduced, the force acting from the multiple spiral tubes is increased. The force acting from the cold water intake pipe 4 is smaller than the force acting from the other multiple spiral tubes 101b (combined forces of the fluid pressure acting from the other multiple spiral tubes 101b, the elastic force of the coil spring 53, and the weight of the valve body 45). Accordingly, by seating the valve body 45 on the annular valve seat 49, the valve 44 blocks the cold water intake pipe 4 from the other multiple spiral tubes 101b. Thereby, cold water is supplied only to some of the multiple spiral tubes through the communication paths 46, and the heating transfer area can be prevented from becoming excessive. As a result, hot water does not rise to a preset temperature or above.

When the temperature of hot water detected by the temperature sensor 37 rises above a preset temperature, the control valve 10 is opened at a small opening, and when the temperature falls below the preset temperature, the control valve 10 is opened at a large opening. The electrically operated valve 8 as an operating valve is closed when the control valve 10 is below the control range or when the temperature of hot water detected by the temperature sensor 37 rises over a preset temperature by a predetermined temperature due to failure of the control valve 10. When the extraction of hot water is stopped and no flow-down of cold water is detected by the flow switch 36 or when the temperature of hot water detected by the temperature sensor 37 rises from the preset temperature by a predetermined temperature due to failure of the flow switch 36, the electrically operated valve 8 as an operating valve is closed. When the extraction of hot water is stopped and no flow-down of cold water is detected by the flow switch 36, the electrically operated valve 8 as the operation valve is closed. Accordingly, the electrically operated valve 8 can be closed immediately, and when the extraction of hot water is restarted, hot water of a relatively low temperature can be extracted.

Figure 4:
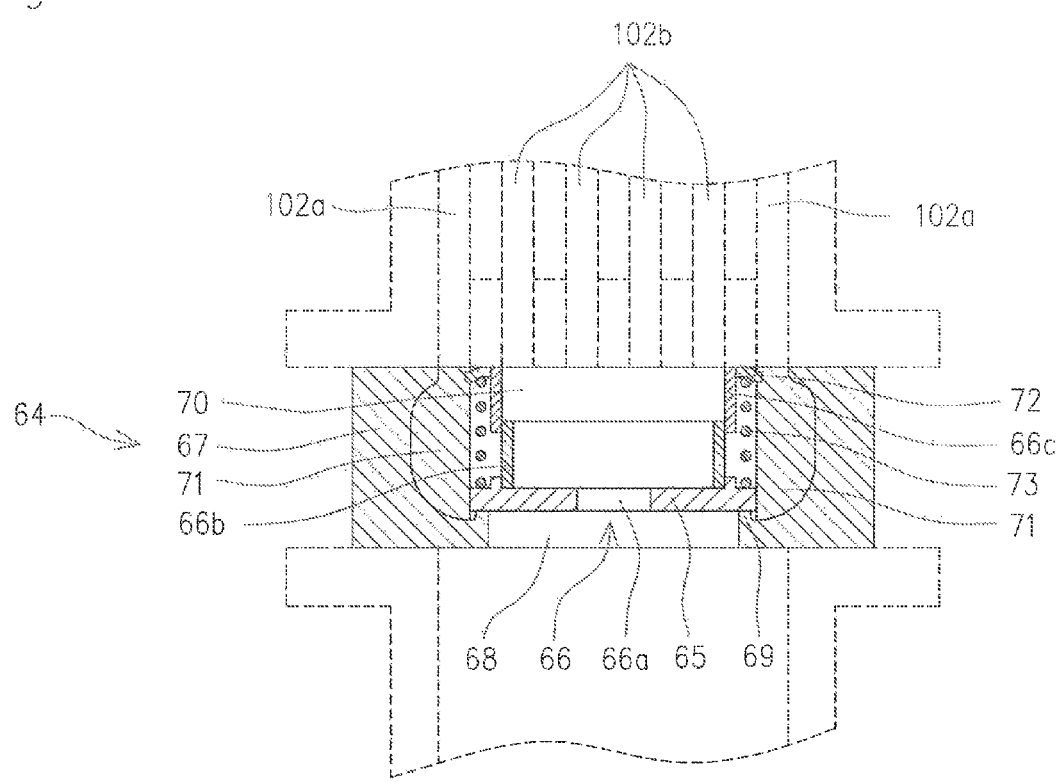
FIG. 4 is a sectional view of a valve of another embodiment of the present invention.

Another embodiment of the present invention is described with reference to FIGS. 4 to 5. FIG. 4 is a sectional view of a valve of another embodiment of the present invention. FIG. 5 is a plan view of the valve of FIG. 4. In FIGS. 4 to 5, a valve 64 that allows and blocks the communication between the cold water intake pipe 4 and other multiple spiral tubes 102b is formed between the cold water intake pipe 4 and multiple spiral tubes.

As shown in FIGS. 4 to 5, the valve 64 is provided with a communication path 66 that communicates between the cold water intake pipe 4 and some multiple spiral tubes 102a, disposed between a flange on the spiral tube side and a flange on the cold water reservoir side, and sandwiched and immobilized by fastening means including bolts and nuts not illustrated.

An inlet 68, an annular valve seat 69, and an outlet 70 are formed in a valve casing 67 of the valve 64. Multiple ribs 71, for example, four ones, that introduce the periphery of a valve body 65 are formed to the inner circumferential wall of the valve casing 67. The disc-like valve body 65 is disposed to the outlet 70 side of the annular valve seat 69. A spring bearing 72 having a hole for fluid passage in its center is disposed to have a periphery inserted in the slots of the ribs 71. A coil spring 73 that biases the valve body 65 toward the annular valve seat 69 is disposed between the valve body 65 and spring bearing 72.

When the force by the fluid pressure acting from the cold water intake pipe 4 is greater than the combined forces of the fluid pressure acting from the multiple spiral tubs, the elastic force of the coil spring 73, and the weight of the valve body 65, the valve 64 communicates between the cold water intake pipe 4 and other multiple spiral tubes 102b.

On the other hand, when the force by the fluid pressure acting from the cold water intake pipe 4 is smaller than the combined forces of the fluid pressure acting from the multiple spiral tubs, the elastic force of the coil spring 73, and the weight of the valve body 65, the valve 64 blocks communication between the cold water intake pipe 4 and other multiple spiral tubes 102b.

The coil spring 73 is omissible in the valve 64. In this case, when the force by the fluid pressure acting from the cold water intake pipe 4 is greater than the combined forces of the fluid pressure acting from the multiple spiral tubes and the weight of the valve body 65, the valve 64 can communicate between the cold water intake pipe 4 and other multiple spiral tubes 102b. When the force by the fluid pressure is smaller than the combined forces of the fluid pressure acting from the multiple spiral tubes and the weight of the valve body 65, the valve 64 can block communication between the cold water intake pipe 4 and other multiple spiral tubes 102b.

Note that the communication path 66 includes a penetration hole 66a holed in the center of the valve body 65 of the valve 64, an inside of an inner cylinder 66b adhered to the valve body 65 by welding, and an inner side of an outer cylinder 66c which is secured to the spring bearing 72 by welding and in which the inner cylinder 66b slides air-tightly.

INDUSTRIAL APPLICABILITY

The present invention is usable for hot water generators that generate hot water by heating cold water with steam heat.

DESCRIPTION OF REFERENCE NUMERALS

1 . . . Corrugated spiral tube type heat exchanger
2 . . . Steam supplying pipe
3 . . . Condensate discharge pipe
4 . . . Cold water intake pipe
5 . . . Hot water extraction pipe 6 . . . Opening and closing valve
7 . . . Gas-liquid separator
8 . . . Electrically operated valve as operating valve
9 . . . Safety valve
10 . . . Control valve
11 . . . Header tank
12 . . . Condensate inflow pipe
13 . . . Check valve
14 . . . Condensate pump
15 . . . Condensate inflow opening
16 . . . Condensate pumping opening
17 . . . Steam introduction opening
18 . . . Steam outlet
19 . . . Condensate pumping pipe
20 . . . Check valve
21 . . . Opening and closing valve
22 . . . Steam introduction pipe
23 . . . Opening and closing valve
24 . . . Strainer
25 . . . Pressure reducing valve
26 . . . Manometer
27 . . . Manometer
28 . . . Condensate removal pipe
29 . . . Steam trap
30 . . . Check valve
31 . . . Condensate outlet
32 . . . Condensate removal pipe
33 . . . Initial air discharge pipe
34 . . . Vent valve
35 . . . Check valve
36 . . . Flow switch
37 . . . Temperature sensor
38 . . . opening and closing valve
42 . . . Cold water reservoir
43 . . . Discharge pipe
44 . . . Valve
45 . . . Valve body
46 . . . Communication path
47 . . . Valve casing
48 . . . Inlet
49 . . . Annular valve seat
50 . . . Outlet
51 . . . Rib
52 . . . Spring bearing
101 . . . Spiral tube

The invention claimed is:

1. A hot water generator in which a cold water intake pipe and a hot water extraction pipe that communicate with multiple spiral tubes and a steam supplying pipe and a condensate discharge pipe that communicate with a shell are connected to a corrugated spiral tube type heat exchanger,
wherein a first communication path that communicates the cold water intake pipe with a first subset of the multiple spiral tubes is provided between the cold water intake pipe and the multiple spiral tubes, and
a valve is provided to communicate via a second communication path the cold water intake pipe with a second subset of the multiple spiral tubes when a force acting from the cold water intake pipe becomes larger than a force acting from the second subset of the multiple spiral tubes and to block the cold water intake pipe from the second subset of the multiple spiral tubes when the force acting from the cold water intake pipe becomes smaller than the force acting from the second subset of the multiple spiral tubes, wherein the first communication path that communicates the cold water intake pipe with a first subset of the multiple spiral tubes is open when the valve blocks the second communication path between the cold water intake pipe and the second subset of the multiple spiral tubes,
wherein the force acting from the second subset of the multiple spiral tubes includes a force by a fluid pressure from the second subset of the multiple spiral tubes,
wherein a valve body of the valve has a disc-like shape extending in a perpendicular direction relative to a flow path of the second subset of the multiple spiral tubes,
wherein the valve body is arranged such that the force acting from the cold water intake pipe and the force acting from the second subset of the multiple spiral tubes act on the valve body,
wherein the first communication path extends through the valve and the valve is configured to allow free flow through the first communication path independent of the position of the valve body,
wherein the valve is positioned in the first communication path and the second communication path between the cold water intake and the first and second subsets of the multiple spiral tubes, and
wherein the valve is configured to separate the first communication path to the first subset of multiple spiral tubes from the second communication path to the second subset of multiple spiral tubes.

2. The hot water generator according to claim 1, wherein the first communication path is provided at a periphery of the valve.

3. The hot water generator according to claim 1, wherein the first communication path is provided in a valve body of the valve.

4. The hot water generator according to claim 1, wherein the force acting from the second subset of the multiple spiral tubes further includes an elastic force of a coil spring of the valve and a force of a weight of the valve body.

5. The hot water generator according to claim 2, wherein the force acting from the second subset of the multiple spiral tubes further includes an elastic force of a coil spring of the valve and a force of a weight of the valve body.

6. The hot water generator according to claim 3, wherein the force acting from the second subset of the multiple spiral tubes further includes an elastic force of a coil spring of the valve and a force of a weight of the valve body.

7. The hot water generator according to claim 1, wherein the force acting from the second subset of the multiple spiral tubes further includes a weight of the valve body.

8. The hot water generator according to claim 2, wherein the force acting from the second subset of the multiple spiral tubes further includes a weight of the valve body.

9. The hot water generator according to claim 3, wherein the force acting from the second subset of the multiple spiral tubes further includes a weight of the valve body.

10. The hot water generator according to claim 1, wherein the valve body having the disc-like shape communicates/blocks the cold water intake pipe and the second subset of the multiple spiral tubes.

* * * * *